United States Patent
Watanae

(10) Patent No.: US 7,602,420 B2
(45) Date of Patent: Oct. 13, 2009

(54) IMAGE CAPTURE APPARATUS, METHOD FOR CONTROLLING THE SAME AND COMPUTER PROGRAM

(75) Inventor: Takeshi Watanae, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 634 days.

(21) Appl. No.: 11/192,922

(22) Filed: Jul. 29, 2005

(65) Prior Publication Data
US 2006/0028557 A1 Feb. 9, 2006

(30) Foreign Application Priority Data
Aug. 6, 2004 (JP) ............... 2004-231449
Oct. 7, 2004 (JP) ............... 2004-295025

(51) Int. Cl.
*H04N 5/232* (2006.01)
*H04N 5/222* (2006.01)

(52) U.S. Cl. ............... 348/211.2; 348/211.99; 348/333.02

(58) Field of Classification Search ............ 348/231.99, 348/231.2, 231.3, 211.99, 211.2, 211.3, 207.11
See application file for complete search history.

(56) References Cited

U.S. PATENT DOCUMENTS 6,628,326 B1  9/2003  Manico
6,798,445 B1*  9/2004  Brumitt et al. ......... 348/207.11
2001/0045985 A1*  11/2001  Edwards et al. ............. 348/231
2002/0036698 A1*  3/2002  Mizutani ..................... 348/232
2003/0174233 A1*  9/2003  Onozawa .................... 348/349
2004/0061792 A1*  4/2004  Ota et al. ................... 348/231.3
2004/0257457 A1*  12/2004  Stavely et al. .......... 348/333.01

FOREIGN PATENT DOCUMENTS

EP   1065880      3/2001
JP   2001-54103   2/2001

* cited by examiner

*Primary Examiner*—Kelly L Jerabek
(74) *Attorney, Agent, or Firm*—Canon USA Inc IP Div

(57) ABSTRACT

An information code displayed on an image receiver is photographed by an image capture apparatus. Digital data representing a number unique to the image capture apparatus and digital data representing the information code unique to the image receiver obtained by photographing are encoded in accordance with digital data representing the information code, then transferred to a digital wireless sending section, and broadcasted via an antenna as a digital wireless signal. A microprocessor mounted on the image receiver decodes the digital data representing a number unique to the image capture apparatus and the digital data representing the information code unique to the image receiver utilizing the digital data representing the information code. Thus, for transmitting an image signal and an audio signal between the image capture apparatus and the image receiver by wireless, apparatuses are authenticated by each other. Accordingly, in a combination of the image capture apparatus and the image receiver, safety communication can be established.

7 Claims, 12 Drawing Sheets

FIG.14

SETTING OF DISPLAY SCREEN
WHEN PAIRING IS ACTIVATED

DISPLAY OF IMAGE
CAPTURE OPERATION  · · · · · DISPLAY DEVICE (1)

DISPLAY DEVICE (2)

FIG.15

SETTING OF DISPLAY SCREEN
WHEN PAIRING IS ACTIVATED

DISPLAY OF IMAGE
CAPTURE OPERATION  · · · · · DISPLAY DEVICE (1)

DISPLAY DEVICE (2)

IMAGE CAPTURE APPARATUS, METHOD FOR CONTROLLING THE SAME AND COMPUTER PROGRAM

BACKGROUND OF THE INVENTION

1. Field of the Invention

The present invention relates to a technique for transmitting image data captured by image capture means to external apparatuses

2. Description of the Related Art

As a method for transmitting an image signal and an audio signal from a video camera to an image receiver and a printer, it has been a common practice to transmit the signals by wired connection utilizing cable or the like. In recent years, the video camera capable of transmitting the image signal and the audio signal by wireless connection has also been proposed. Further, a technique is known to perform the authentication of an ID code by the wired connection or direct entry which does not allow simultaneous receiving of the image signal and the audio signal by a plurality of image receivers and printers in consideration of the security problem arising during transmitting data by wireless.

However, the wired connection utilizing the cable for transmitting the image signal and the audio signal from the video camera to the image receiver and the printer has led to the complicated connection, causing a connection miss or the like.

On the other hand, in the case of using a method for transmitting the image signal and the audio signal to other apparatuses by wireless, a communication method itself is not directive, thus not only the apparatus designated as a destination of transmission but also other apparatus can receive the data.

Accordingly, it is important to send the data in such a way that allows only communication apparatus designated as the destination of transmission to recognize the data. Therefore, it is important to mutually authenticate the apparatus at the other end, to encrypt the data or to exchange ID with each other. Hereinafter, mutual authentication of one apparatus with the other apparatus will be referred to as pairing.

For the purpose of ensuring safe and reliable communication between each apparatus, a pairing technique of mutually authenticating the apparatus is important. However, it is extremely burdensome to perform the authentication of the ID code as described above.

SUMMARY OF THE INVENTION

An aspect of the present invention is to overcome all of or at least one of the above-described drawbacks.

Another aspect of the present invention is to facilitate pairing for transmitting data between an image capture apparatus and an external apparatus.

In one aspect of the present invention, an image capture apparatus includes an image capture unit, a recognition unit configured to recognize communication information for conducting communication with an external apparatus from image data captured by the image capture unit, a sending unit configured to send the communication information recognized by the recognition unit and communication information possessed by the image capture apparatus, and a transmission unit configured to perform conversion processing of image data captured by the image capture unit based on the communication information on the external apparatus identified by the recognition unit and the communication information on the image capture apparatus, and to transmit the converted image data to the external apparatus.

Further, another aspect of the present invention is to provide an apparatus having excellent usability when pairing is performed with an external apparatus by an image capture apparatus, such as a digital camera and a digital video camera.

In another aspect of the present invention, an image capture apparatus includes an image capture unit, a recognition unit configured to recognize communication information for conducting communication with an external apparatus from image data of a predetermined portion of the external apparatus captured by the image capture unit, a sending unit configured to send the communication information recognized by the recognition unit and communication information possessed by the image capture apparatus, and a control unit configured to perform control such that an image capture operation of the image capture unit for facilitating recognition by the recognition unit is performed concurrently with an image reproduction operation other than for the recognition.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is a selection screen (1) of an image capture status display apparatus on a display device of an image capture apparatus according to a fifth embodiment of the present invention.

FIG. 15 is a selection screen (2) of an image capture status display apparatus indicated on a display device of an image capture apparatus according to a fifth embodiment of the present invention.

DETAILED DESCRIPTION OF THE EMBODIMENTS

Embodiments of the invention are described in detail below with reference to the drawings.

First Embodiment

Figure 1:
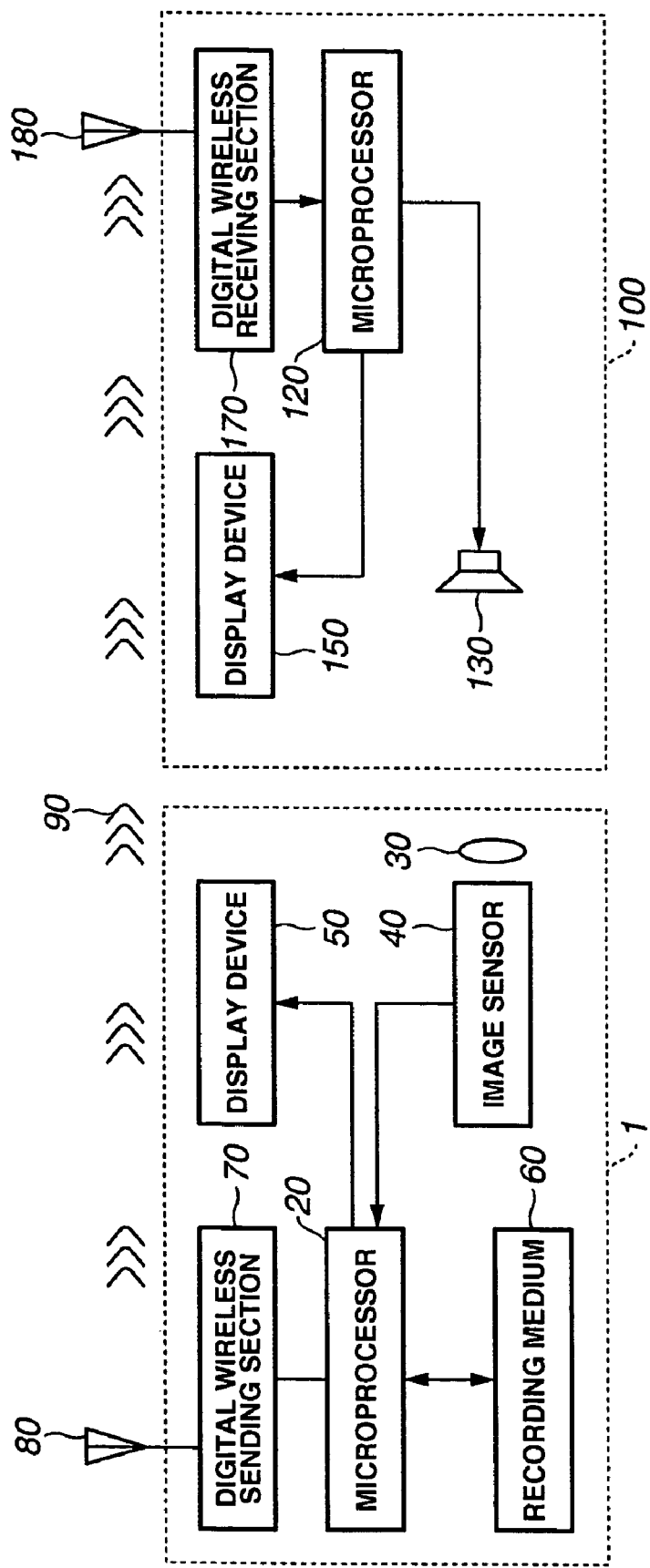
FIG. 1 is a diagram showing a configuration of a wireless communication system according to a first embodiment of the present invention.

FIG. 1 is a diagram showing a configuration of a wireless communication system constituted by an image capture apparatus 1 of a video camera or the like having the function of sending a wireless signal, and an image receiver 100 having the function of receiving the wireless signal.

In the image capture apparatus 1, reference numeral 20 denotes a microprocessor having the function of recognizing a character, reference numeral 30 denotes a lens, reference numeral 40 denotes an image sensor constituted by a CCD or the like, reference numeral 50 denotes a display device, reference numeral 60 denotes a recording medium, reference numeral 70 denotes a digital wireless sending section, and reference numeral 80 denotes an antenna for wireless communication.

Also, in the image receiver 100, reference numeral 120 denotes the microprocessor, reference numeral 130 denotes a loudspeaker, reference numeral 150 denotes the display device, reference numeral 170 denotes a digital wireless receiving section, and reference numeral 180 denotes the antenna for the wireless communication.

Figure 2:
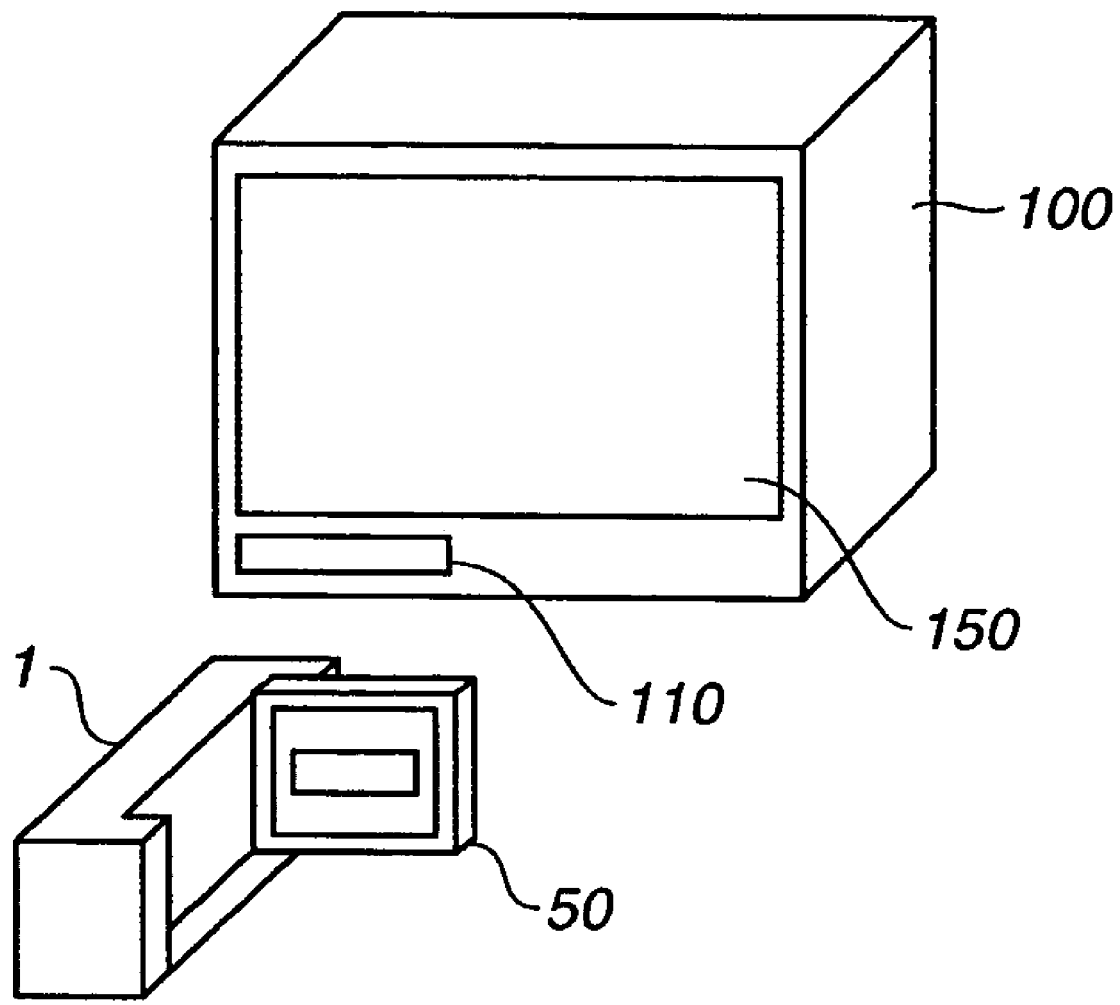
FIG. 2 is an external view of a wireless communication system according to a first embodiment of the present invention.

FIG. 2 is an external view of a wireless communication system constituted by the image capture apparatus 1 and the image receiver 100. An information code 110 unique to each apparatus such as a MAC (Media Access Control) address or the like is marked on a casing of the image receiver 100. This information code 110 is utilized as communication information for mutually authenticating its own apparatus and other apparatuses to establish communication.

The information code 110 are indicated, for example, with a number itself (numeral), character information, and information unique to the image receiver 100 (serial number or the like) or a bar code. It should be noted that encryption information such as an ESSID (Extended Service Set ID) as a network identifier in a wireless LAN, a WEP (Wired Equivalent Privacy) key and others may also be included in the information code 110 without deviating from the present invention.

Figure 5:
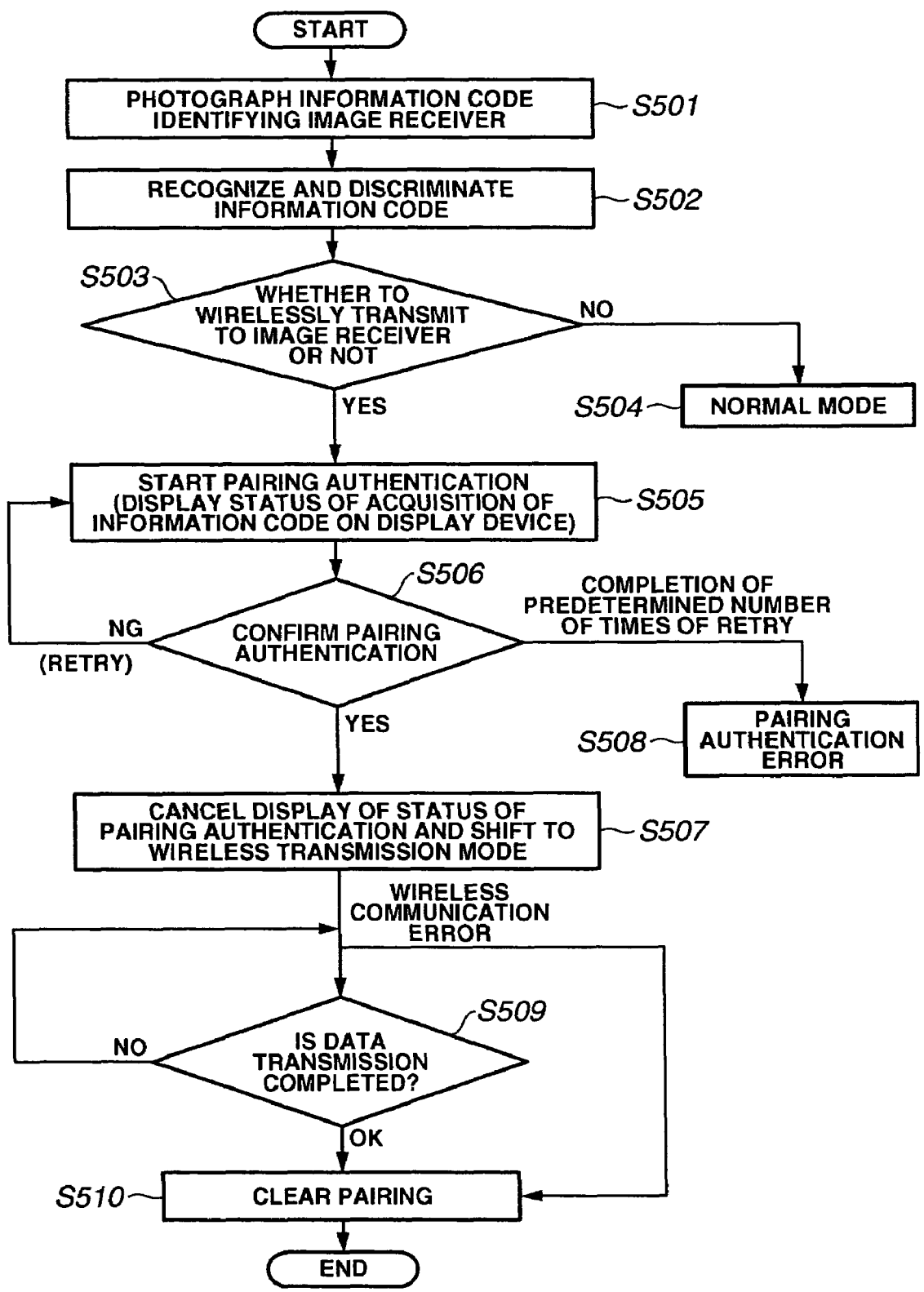
FIG. 5 is a flow chart showing an operation in a wireless communication system according to a first embodiment of the present invention.

With reference to a flow chart in FIG. 5, an operation in the wireless communication system according to the first embodiment of the present invention is described bellow. As shown in FIG. 2, the information code 110 displayed on the image receiver 100 is photographed by the image capture apparatus 1 (step S501). Hence, the information code 110 is focused on the image sensor 40 via the lens 30, converted to an electric signal, and transferred to the microprocessor 20 as image information.

Figure 3:
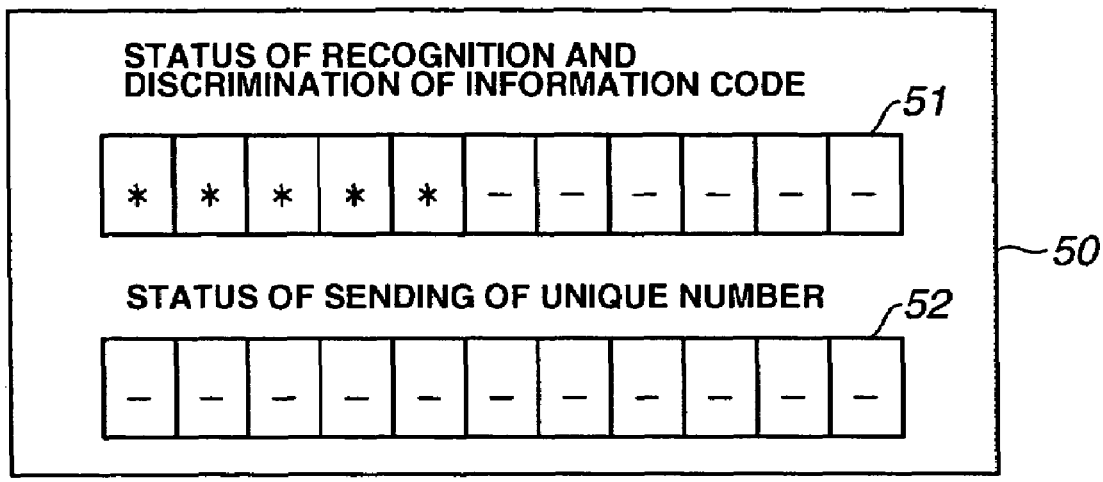
FIG. 3 is a diagram showing an example of a display of the pairing authentication status indicated on a display device of an image capture apparatus.

The microprocessor 20 mounted on the image capture apparatus 1 recognizes and discriminates the information code 110 of the image receiver 100 by executing the function of character recognition based on the image information so as to convert the information code 110 to digital data (step S502). In this case, as shown in FIG. 3, a recognized and discriminated item as digital data from among the information codes 110 which are unique to the image receiver 100 is displayed by a symbol [*] while an unrecognized and non-discriminated item is displayed by a symbol [-] on the display device 50 of the image capture apparatus 1 (display 51). In this way the status of recognition and discrimination of the information code 110 is notified.

Further, the microprocessor 20 maintains the number unique to the image capture apparatus 1 as digital data. If wireless transmission to the image receiver 100 is demanded (step S503), the digital data representing the number unique to the image capture apparatus 1, and the digital data representing the information code 110 unique to the image receiver 100 which is obtained by the recognition and discrimination as described above are optionally encoded by a standard encoding technique in response to the digital data representing the information code 110, then transferred to the digital wireless sending section 70, and broadcasted as a digital wireless signal 90 via the antenna 80. In this case, as shown in FIG. 3, among the digital data representing the number unique to the image capture apparatus 1, the data which was already sent is displayed by a symbol [*] while the data which is not yet sent is displayed by a symbol [-] on the display device 50 of the image capture apparatus 1 (display 52) so that the status of sending is notified.

In the step S503, if it is determined that no wireless transmission is performed, the process moves to a normal mode (step S504).

In the image receiver 100, the digital wireless signal 90 broadcasted from the image capture apparatus 1 is received by the digital wireless receiving section 170 via the antenna 180.

Figure 4:
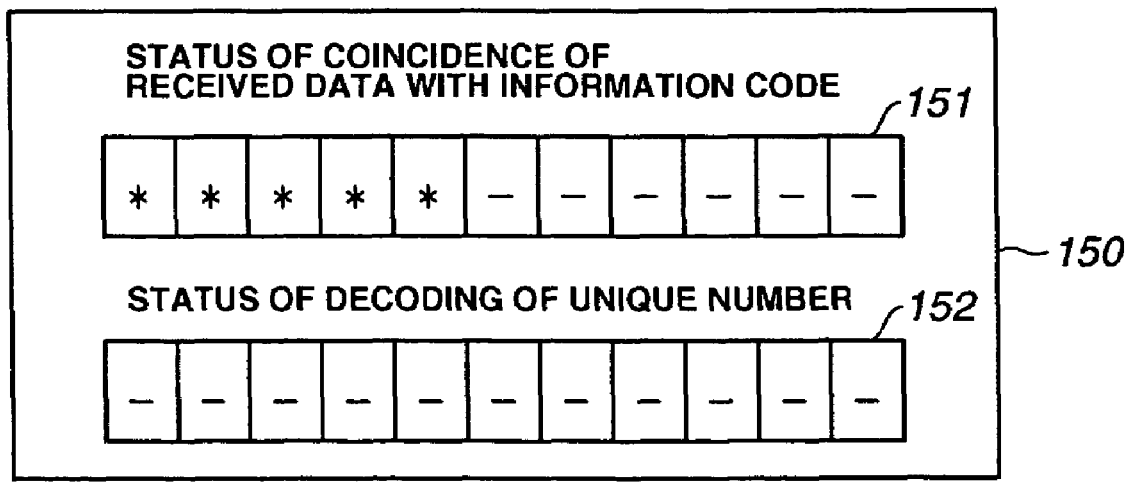
FIG. 4 is a diagram showing an example of a display of the pairing authentication status indicated on a display device of an image receiver.

The microprocessor 120 of the image receiver 100 decodes the digital data representing the number unique to the image capture apparatus 1 and the digital data representing the information code 110 unique to the image receiver 100 utilizing the digital data representing the information code 110. In this case, as shown in FIG. 4, an item, in which the information code 110 unique to the image receiver 100 obtained from the digital wireless signal 90 that was received by the digital wireless receiving section 170 coincides with its own information code, is displayed by a symbol [*] on the display device 150 of the image receiver 100 (display 151). On the other hand, an unrecognized and non-discriminated item is displayed by a symbol [-] on the display device 150 (display 151). Further, a decoded item among the digital data representing the number unique to the image capture apparatus 1 is displayed by a symbol [*] while a non-decoded and non-received item is displayed by a symbol [-] (display 152).

Thus, pairing authentication for exchanging an image signal and an audio signal between the image capture apparatus 1 and the image receiver 100 by wireless transmission is established (steps S505 and S506).

After the pairing authentication is confirmed (step S506), a display of the status of the pairing authentication shown in FIGS. 3 and 4 is removed from the display devices 50 and 150, and the process moves to a wireless transmission mode (step S507). In a case where the pairing authentication cannot be performed even after retrying the predetermined number of times, this case is notified as a pairing authentication error (step S508).

In a wireless transfer mode, image signal data photographed by the image capture apparatus 1 via the lens and converted to the electric signal by the image sensor 40 and audio signal data obtained by a microphone or the like (not shown) are optionally encoded by the standard encoding technique in response to the digital data of the information code 110 obtained by photographing as described above and the digital data of the number unique to the image capture apparatus 1. Then, the data thus encoded is transferred to the digital wireless sending section 70, and broadcasted as the digital wireless signal 90 via the antenna 80.

In the image receiver 100, the digital wireless signal 90 broadcasted from the image capture apparatus 1 is received by the digital wireless receiving section 170 via the antenna 180. The microprocessor 120 of the image receiver 100 decodes the digital data of the received image signal data using the digital data representing the information code 110. The decoded image signal is displayed on the display device 150. The digital data of the received audio signal data are similarly decoded using the digital data representing the information code 110. The decoded audio signal is converted to real voice by the loudspeaker 130 mounted on the image receiver 100.

When transmission of the image signal and the audio signal is finished (step S509), the pairing authentication between the image capture apparatus 1 and the image receiver 100 is cleared (step S510).

The digital data representing the information code 110 unique to the image receiver 100 obtained by photographing may be stored in the recording medium 60, for example, as information to which an optional code is added. In this case, when the pairing authentication is performed again and data are transmitted, the stored digital data can be used, thus it becomes unnecessary to photograph the information code 110 again.

Second Embodiment

Figure 6:
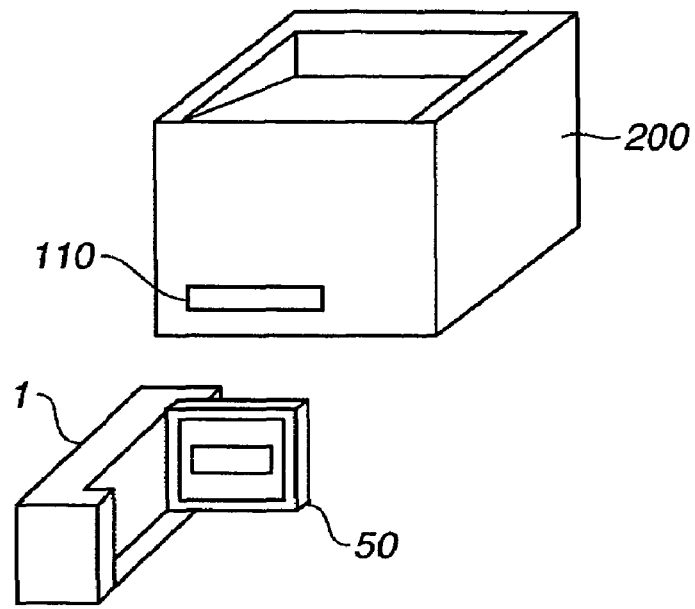
FIG. 6 is an external view of a wireless communication system according to a second embodiment of the present invention.

As shown in FIG. 6, it is also possible to similarly acquire the information code 110 from a printer 200 to establish the pairing authentication in place of acquiring from the image receiver 100 described in the first embodiment of the present invention.

Third Embodiment

Figure 7:
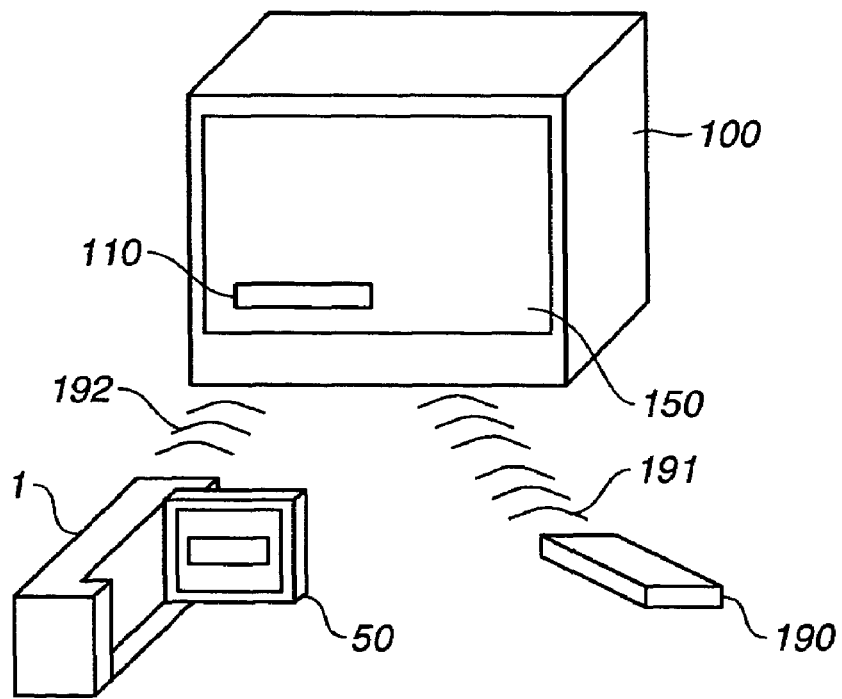
FIG. 7 is an external view of a wireless communication system according to a third embodiment of the present invention.

As shown in FIG. 7, the information code 110 unique to the image receiver 100 can be displayed on the display device 150 of the image receiver 100 by a trigger signal 191 from a remote controller 190 of the image receiver 100 or by a trigger signal 192 from the image capture apparatus 1. Even in this case, the information code 110 displayed on the display device 150 can be photographed by the image capture apparatus 1.

Fourth Embodiment

Figure 8:
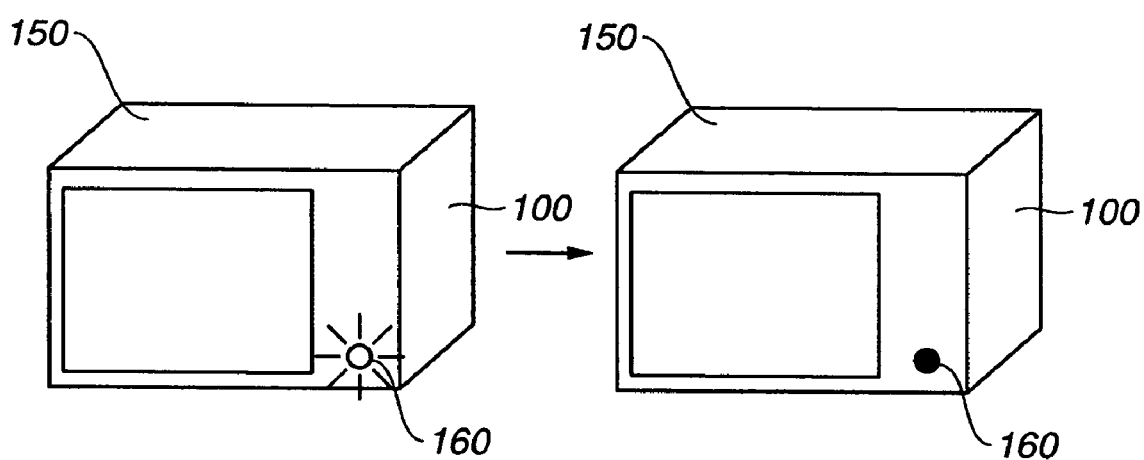
FIG. 8 is an external view showing an image receiver according to a fourth embodiment of the present invention.

As shown in FIG. 8, in place of the display by the display device 150 described with respect to the first embodiment of the present invention, a display of the pairing authentication status may be performed, for example, by turning on and off an emission section 160 of the image receiver 100 while the data is being sent and received, or by lighting the emission section 160 after the operation is completed. Alternatively, the emission section 160 can be provided in the image capture apparatus 1.

Fifth Embodiment

A fifth embodiment of the present invention is applied to an image capture and reproduction apparatus having the function of image capture and reproduction, and is configured so as to operate these functions concurrently.

Figure 9:
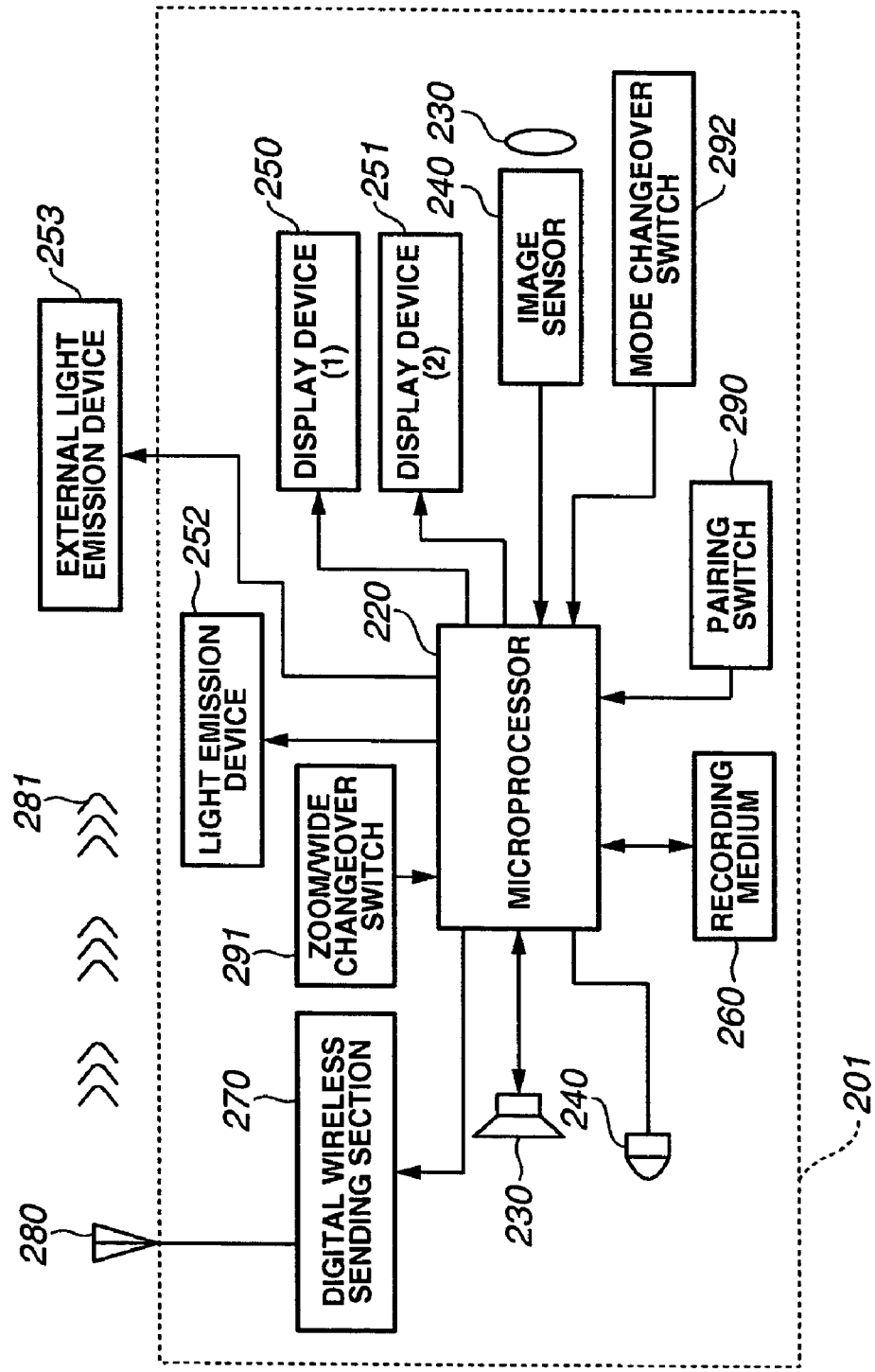
FIG. 9 is a block diagram of an image capture and reproduction apparatus having a function of image capture and reproduction according to a fifth embodiment of the present invention.
Figure 10:
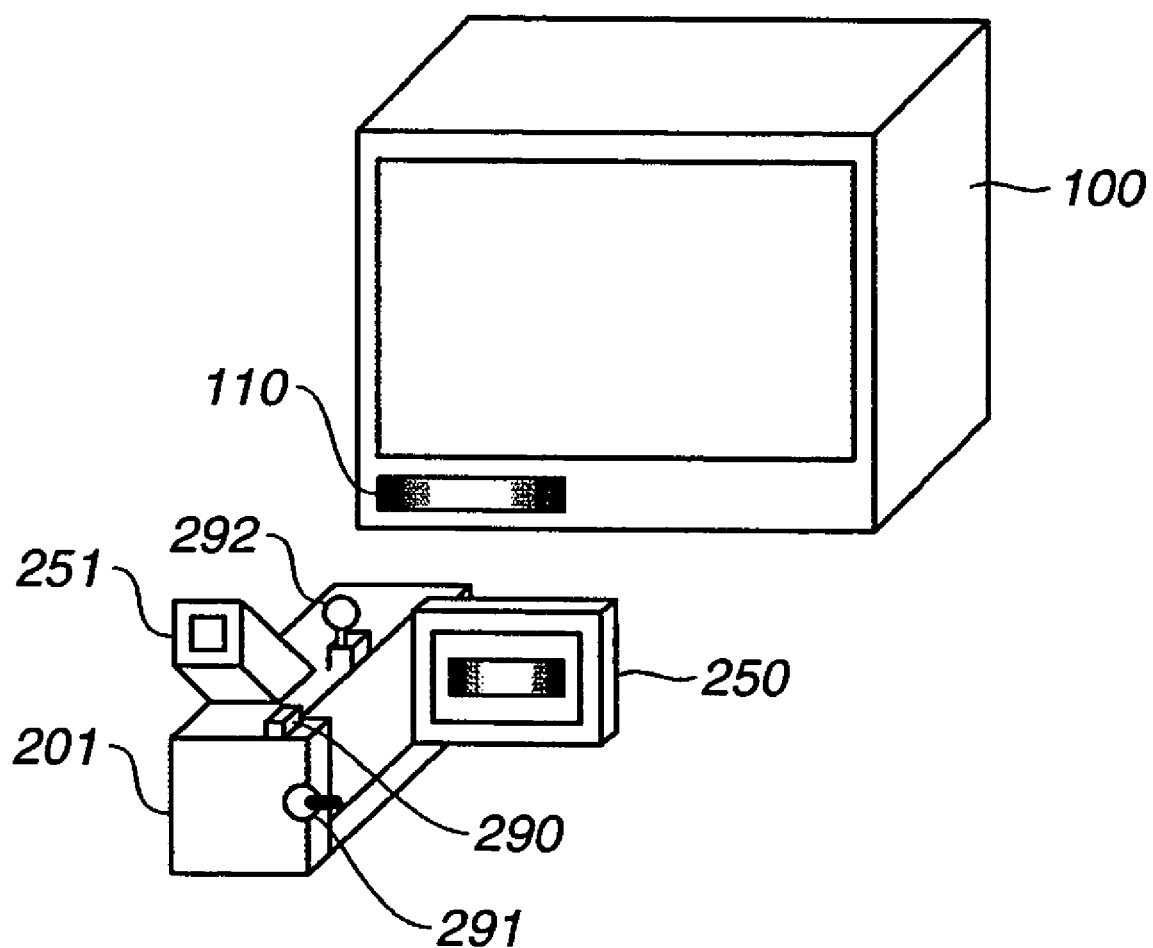
FIG. 10 is an external view of a wireless communication system according to a fifth embodiment of the present invention.

FIG. 9 is a block diagram of an image capture and reproduction apparatus 201 showing a wireless communication system similar to the system according to the first embodiment of the present invention. An operation mode changeover switch 292 shown in FIG. 1 allows the image capture and reproduction apparatus 201 to select between an image capture mode and a reproduction mode. A pairing switch 290 can activate a pairing operation during reproduction, and a zoom/wide changeover switch 291 can set an angle of view during image capture. FIG. 10 is an external view of the wireless communication system constituted by the image capture apparatus 201 and the image receiver 100. A configuration of the image receiver 100 will be similar to the first embodiment of the present invention.

Figure 13:
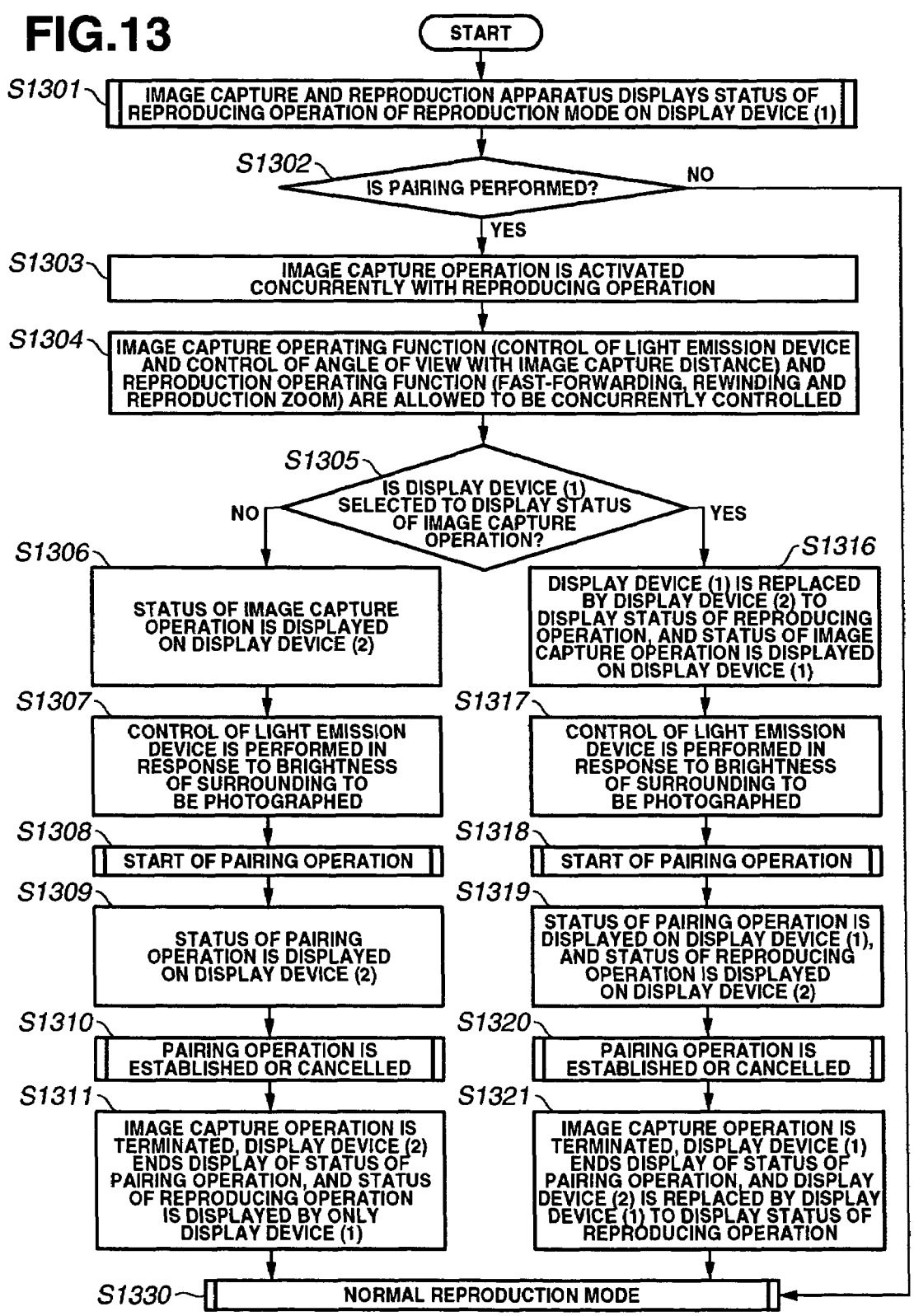
FIG. 13 is a flow chart showing processing of an image capture apparatus according to a fifth embodiment of the present invention.

The operation of the image capture apparatus according to the fifth embodiment of the present invention is described using a flow chart shown in FIG. 13. The processing shown in the flow chart is controlled by a microprocessor 220.

Figure 11:
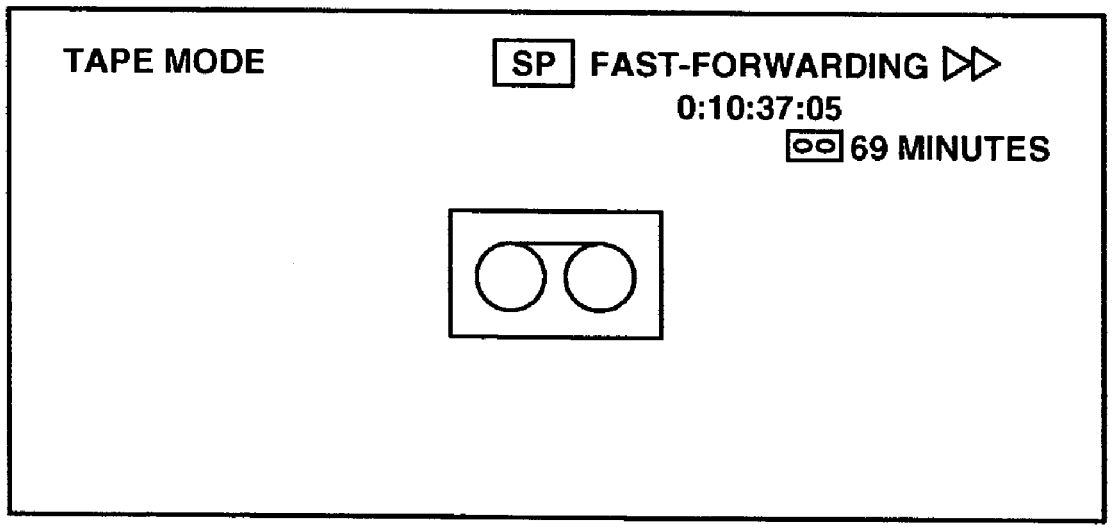
FIG. 11 is a diagram showing a display of the reproduction status according to a fifth embodiment of the present invention.

First, when the reproduction mode is selected by the operation mode changeover switch 292 of the image capture and reproduction apparatus 201, the image capture and reproduction apparatus 201 activates a reproduction operation. This operation status is displayed on the display device 50 as shown in FIG. 11 (S1301).

In this state, the pairing switch 290 is checked to detect whether it is depressed (S1302). If the depression is not detected, the process simply operates in a normal reproduction mode (S1330).

Here, if the pairing switch 290 is depressed, the image capture and reproduction apparatus 201 activates the reproduction operation and an image capture operation simultaneously and in parallel (S1303).

After activation is performed, by an instruction of a user or automatic control, the image capture operation such as control of auxiliary light or control of zoom, and the reproduction operation such as fast-forwarding, rewinding can be performed simultaneously (S1304). In this state, as shown in FIG. 14, a display device 250 switches from a display of the status of the reproduction operation to a display by which the user selects the display device that displays the status of the image capture operation at the time of activating the pairing operation (S1305).

Figure 12:
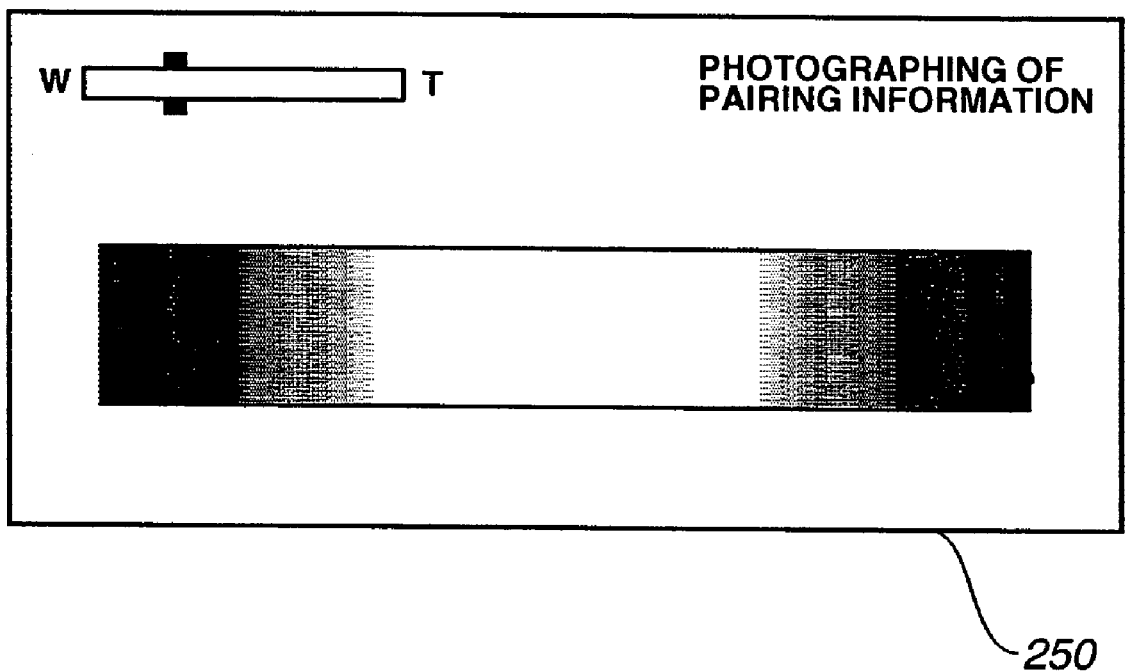
FIG. 12 is a diagram showing a display of the status of an image capture operation according to a fifth embodiment of the present invention.

If a display device (1) is elected for the display of the image capture operation, the display device 250 switches from a display device selection screen to the display of the status of the image capture operation as shown in FIG. 12, and the status of the reproduction operation is displayed on a display device 251 as shown in FIG. 11 (S1316). Further, such selection of the screen display may be configured so as to be changed by a switch attached to the image capture and reproduction apparatus 201 or by selection of data. The setting of the display screen may be selected in advance, and the processing of this step can be performed in response to the activation processing in the step S1303. In this state, while confirming the angle of view by the display device 250, the zoom/wide changeover switch 291 is adjusted to an optimum position, and the information code 110 displayed on the image receiver 100 is photographed by the image capture and reproduction apparatus 201.

If the surroundings are dark at the time of acquiring the information code 110, an internal light emission device 252 mounted on the image capture and reproduction apparatus 201 or an external emission device 253 connected to the image capture and reproduction apparatus 201 are controlled to irradiate the information code 110 with light and to perform photographing (S1317).

After the information code 110 is allowed to be photographed in an optimum condition, the pairing operation is started (S1318). In this state, the display device 250, as shown in FIG. 3 or 4, switches from the display of the status of the image capture operation to the display of the status of the pairing operation (S1319).

Here, the information code 110 is photographed via a lens 230 in the image capture apparatus 201, converted to an electric signal by an image sensor 240 or the like, and transferred to the microprocessor 220 as the image information. The transferred image information is confirmed or discriminated as the information code 110 of the image receiver 100 by the function of code recognition of the microprocessor 220, and converted to digital data. The microprocessor 220 maintains the number unique to the image capture apparatus 201 as the digital data. These digital data are optionally encoded by a standard encoding technique in response to the digital data of the information code 110. Then the digital data are transferred to a digital wireless sending section 270, and broadcasted as a digital wireless signal 281 via an antenna 280. Thus, even when the image capture and reproduction apparatus 201 are in the midst of activating the pairing operation, the reproduction operation can be confirmed by the display device 251 and the operation can be performed.

After establishing or canceling pairing (S1320), the image capture and reproduction apparatus 201 terminates the image capture operation and, as shown in FIG. 11, the display device 250 switches from the display of the status of the pairing operation to the display of the status of the reproduction operation. The display device 251 ends display operation (S1321) and the process returns to the normal reproduction mode (S1330).

As described above, according to the fifth embodiment of the present invention, the image capture operation for pairing and the reproduction operation of image data can be performed in parallel. More specifically, while fast-forwarding, rewinding, zooming, and others are controlled, zoom control of an image capture section can also be performed for recognition operation.

Further, one display can show a state of the image capture operation, and another display can perform reproduction of the image. Furthermore, even in a reproduction mode, the auxiliary light or the like can be emitted in accordance with the surrounding environment.

Sixth Embodiment

According to the fifth embodiment of the present invention, in the case where, in setting the display screen of the step S1305, the display device (2) is elected for the display of the image capture operation, as shown in FIG. 15, the display device 250 continuously displays the status of the reproduction operation and, the display device 251 displays the status of the image capture operation (S1306) as shown in FIG. 12.

After establishing or canceling pairing, the image capture and reproduction apparatus 201 terminates the image capture operation, the display device 251 ends the display of the status of the pairing operation (S1311), and the process returns to the normal reproduction mode (S1330).

While the image is confirmed by one display in the reproduction mode, the pairing with other apparatuses is performed. At this time, if the function of photographing an image is turned on and the code information for pairing is photographed, a small window is displayed and a photographing status of a pairing code may be displayed thereon. It is convenient to display a reproduction image and a photographed image simultaneously using a so-called picture-in-picture (PinP) function. In this case, only one display is required.

Further, an image reproduced in reproduction mode can be maintained.

However, if the reproduction mode is ended entirely, it is necessary to select the image again after pairing, which is inconvenient for the user.

Furthermore, if the photographing function is automatically turned off when the pairing is completed, the operation becomes very simple and convenient for the user.

Moreover, particularly if the PinP function is cancelled when the pairing is completed, good visibility can be obtained when the reproduced image is displayed in detail. Besides, the user can easily and conveniently recognize that photographing of the pairing is completed.

As described above, according to the embodiments of the present invention, the pairing for communication between the image capture apparatus and other apparatuses (for example, image receiver and printer) can simply be performed. Further, image capture of pairing and the image reproduction for other purposes can be performed concurrently.

Other Embodiments

An aspect of the present invention can also be achieved by providing a system or an apparatus with a recording medium on which a program code of software, which realizes the function of the above-described embodiment of the present invention, is recorded, reading the program code stored in the recording medium by a computer (CPU or MPU) mounted on the system or the apparatus, then executing the program.

In this case, the function of the above-described embodiment of the present invention is achieved by the program code itself read from the recording medium, thus the program code itself and the recording medium storing the program code constitute the present invention.

As the recording medium for providing the program code, for example, a floppy disk, a hard disk, an optical disk, a magneto-optical disk, a CD-ROM, a CD-R, a magnetic tape, a non-volatile memory card, a ROM or the like can be used.

Further, the function of the above-described embodiment of the present invention can be achieved not only by executing the program code read by the computer, but the present invention also includes a case where an OS (basic system or operating system) or the like running on the computer executes a part or entire practical processing based on the instructions of the program code, and realizes the function according to the above embodiments.

Furthermore, the present invention also includes the case in which the program code read from the recording medium is written in a memory provided on a function extension board inserted into the computer and a function extension unit connected to the computer, and then based on the instructions of the program code, the CPU or the like contained in the function extension board and the function extension unit executes a part or entire practical processing, and realizes the function of the above embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application Nos. 2004-231449 filed Aug. 6, 2004 and 2004-295025 filed Oct. 7, 2004, which are hereby incorporated by reference herein in its entirety.

What is claimed is:

1. An image capture apparatus having an image capture mode for capturing performance and a reproduction mode for reproducing and displaying image data, comprising:
    an image capture unit;
    a selecting unit configured to select the image capture mode or the reproduction mode;
    a display control unit configured to control a display of a reproduced image on a display unit when the reproduction mode is selected by the selecting unit;
    a recognition unit configured to recognize communication information for conducting communication with an external apparatus from image data captured by the activated image capture unit;
    a sending unit configured to send the communication information recognized by the recognition unit and communication information possessed by the image capture apparatus and establishing the communication; and
    a controller configured to control, in a case where the image capture apparatus tries to communicate with the external apparatus under the reproduction mode, the mode to be switched back to a normal reproduction mode by activating the image capture unit and by stopping the image capture unit when the recognition unit recognizes the communication information.

2. The image capture apparatus according to claim 1, wherein the communication information includes information based on a number unique to the external apparatus represented by one of a numeral and a bar code.

3. The image capture apparatus according to claim 1, further comprising a notification unit, the notification unit being configured to notify a user of a recognition status of the communication information for conducting communication with the external apparatus.

4. The image capture apparatus according to claim 1, further comprising a storage unit, the storage unit being configured to store the communication information for conducting communication with the external apparatus recognized by the recognition unit,
    wherein, when repeatedly communicating with the external apparatus, the transmission unit uses information optionally selected from the communication information stored on the storage unit.

5. The image capture apparatus according to claim 1, wherein the display unit is capable of simultaneously displaying an image reproduced in the reproduction mode and an image captured by the image capture apparatus.

6. A method of capturing images in an image capture apparatus having an image capture unit, an image capture mode for capturing performance and a reproduction mode for reproducing and displaying image data, comprising:
    selecting the image capture mode or the reproduction mode;
    displaying a reproduced image on a display unit when the reproduction mode is selected in the selecting step;
    recognizing communication information for conducting communication with an external apparatus from image data captured by the activated image capture unit;
    sending the communication information recognized in the recognizing step and communication information possessed by the image capture apparatus and establishing the communication; and
    controlling, in a case where the image capture apparatus tries to communicate with the external apparatus under the reproduction mode, the mode to be switched back to the reproduction mode by activating the image capture unit and by stopping the image capture unit when the communication information is recognized.

7. A computer-readable medium having stored thereon a computer program comprising program code having computer-executable instructions for causing a computer to execute the method according to claim 6.

* * * * *